US009511751B2

(12) United States Patent
Zagorski et al.

(10) Patent No.: US 9,511,751 B2
(45) Date of Patent: Dec. 6, 2016

(54) OBJECT IDENTIFICATION AND ACTIVE SAFETY CONTROL FOR VEHICLES

(75) Inventors: Chad T. Zagorski, Clarkston, MI (US); Kevin P. Conrad, South Lyon, MI (US); Daniel Gandhi, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 439 days.

(21) Appl. No.: 13/189,415

(22) Filed: Jul. 22, 2011

(65) Prior Publication Data

US 2013/0024075 A1 Jan. 24, 2013

(51) Int. Cl.

| G06F 17/10 | (2006.01) |
|---|---|
| G06G 7/78 | (2006.01) |
| G08G 1/16 | (2006.01) |
| F41G 9/00 | (2006.01) |
| B60T 7/22 | (2006.01) |
| B60W 10/184 | (2012.01) |
| B60W 10/20 | (2006.01) |
| B60W 30/09 | (2012.01) |
| B60W 30/095 | (2012.01) |
| B60W 10/18 | (2012.01) |

(52) U.S. Cl.
CPC ............... *B60T 7/22* (2013.01); *B60W 10/184* (2013.01); *B60W 10/20* (2013.01); *B60W 30/09* (2013.01); *B60W 30/095* (2013.01); *B60W 30/0956* (2013.01); *G08G 1/166* (2013.01); *B60W 10/18* (2013.01); *B60W 2520/10* (2013.01); *B60W 2540/18* (2013.01); *B60W 2550/302* (2013.01); *B60W 2550/304* (2013.01); *B60W 2550/306* (2013.01); *B60W 2720/10* (2013.01); *B60W 2720/12* (2013.01); *B60W 2750/302* (2013.01); *B60W 2750/304* (2013.01); *B60W 2750/308* (2013.01)

(58) Field of Classification Search
CPC ..................... B60R 21/0134; B60W 2750/00; B60W 2750/30; B60W 2750/302; B60W 2750/304; B60W 2750/306; B60W 2750/308
USPC ............ 701/301; 342/104; 340/903; 700/45, 700/300, 301, 302
See application file for complete search history.

(56) References Cited

U.S. PATENT DOCUMENTS

| 4,757,450 | A | * | 7/1988 | Etoh ............................... 701/96 |
| 5,631,639 | A | * | 5/1997 | Hibino et al. ................ 340/903 |
| 5,642,093 | A | * | 6/1997 | Kinoshita et al. ............ 340/439 |
| 5,659,304 | A | * | 8/1997 | Chakraborty ................ 340/903 |

(Continued)

FOREIGN PATENT DOCUMENTS

CN 101497330 A 8/2009

OTHER PUBLICATIONS

State Intellectual Property Office of the Peoples' Republic of China, Office Action in Chinese Patent Application No. 201210252396.X, mailed Oct. 30, 2014.

*Primary Examiner* — Yonel Beaulieu
*Assistant Examiner* — Lail Kleinman
(74) *Attorney, Agent, or Firm* — Lorenz & Kopf, LLP

(57) ABSTRACT

Methods and vehicles are provided for identifying objects in proximity to the vehicle and controlling active safety functionality for the vehicle. A target object in proximity to the vehicle is detected. A movement of the target object is measured. The target object is classified based at least in part on the movement. The active safety functionality is controlled based at least in part on the classification of the target object.

19 Claims, 6 Drawing Sheets

(56) References Cited

U.S. PATENT DOCUMENTS

| | | | |
|---|---|---|---|
| 6,018,308 A * | 1/2000 | Shirai | 342/70 |
| 6,085,151 A * | 7/2000 | Farmer et al. | 701/301 |
| 6,256,584 B1 * | 7/2001 | Kodaka et al. | 701/301 |
| 6,348,877 B1 * | 2/2002 | Berstis et al. | 340/980 |
| 6,571,165 B2 * | 5/2003 | Maruko et al. | 701/93 |
| 6,650,984 B1 * | 11/2003 | Rao et al. | 701/45 |
| 6,687,577 B2 * | 2/2004 | Strumolo | 701/1 |
| 6,753,804 B2 * | 6/2004 | Miyahara | 342/70 |
| 6,794,987 B2 * | 9/2004 | Schiffmann et al. | 340/435 |
| 7,636,625 B2 * | 12/2009 | Weber | B60R 21/0132 180/167 |
| 7,720,580 B2 * | 5/2010 | Higgins-Luthman | 701/28 |
| 2002/0091479 A1 * | 7/2002 | Maruko et al. | 701/96 |
| 2003/0016161 A1 * | 1/2003 | Okai et al. | 342/70 |
| 2003/0030552 A1 * | 2/2003 | Tonkin | 340/435 |
| 2004/0000991 A1 | 1/2004 | Schiffmann et al. | |
| 2006/0089802 A1 * | 4/2006 | Sawamoto | 701/301 |
| 2006/0184297 A1 * | 8/2006 | Higgins-Luthman | 701/41 |
| 2009/0192710 A1 * | 7/2009 | Eidehall et al. | 701/301 |

\* cited by examiner

OBJECT IDENTIFICATION AND ACTIVE SAFETY CONTROL FOR VEHICLES

TECHNICAL FIELD

The present disclosure generally relates to the field of vehicles and, more specifically, to methods and systems for identifying objects proximate vehicles and for controlling active safety features for vehicles.

BACKGROUND

Many vehicles today have active safety systems, such as a forward collision alert (FCA) system, collision preparation system (CPS), and/or enhanced collision avoidance (ECA) system. Such active safety functionality supplements traditional driver control of the vehicle with one or more warnings or automated actions, such as automatic braking and/or steering, in appropriate conditions, such as when another vehicle or object is detected in proximity to the vehicle. While active safety functionality serves valuable purposes, it may be desirable to tailor the active safety actions to particular types of detected objects, and/or to classify different types of detected objects.

Accordingly, it is desirable to provide improved methods for classifying detected objects in proximity to a vehicle. It is also desirable to provide improved methods for tailoring active safety actions for vehicles to particular types of detected objects. It is further desirable to provide improved vehicles that provide for improved classification of detected objects in proximity to the vehicle and/or that tailor active safety actions to particular types of detected objects. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided for identifying objects in proximity to a host vehicle. The method comprises the steps of detecting a target object in proximity to the host vehicle, measuring a movement of the target object, and classifying the target object based at least in part on the movement of the target object using a processor.

In accordance with another exemplary embodiment, a method is provided for controlling an active safety system for a host vehicle. The method comprises the steps of identifying a target object in proximity to the host vehicle, calculating a time to collision between the target object and the host vehicle via a processor, implementing the active safety system if the time to collision is less than a first predetermined threshold if the target object is identified as comprising a motor vehicle, and implementing the active safety system if the time to collision is less than a second predetermined threshold if the target object is identified as comprising an individual not in a motor vehicle, the second predetermined threshold being greater than the first predetermined threshold.

In accordance with a further exemplary embodiment, a vehicle is provided. The vehicle comprises a drive system and an active safety system. The active safety system is coupled to the drive system, and is configured to provide an action during a drive cycle of the vehicle. The active safety system comprises a detection unit and a processor. The detection unit is configured to detect a target object in proximity to the vehicle and measure a movement of the target object. The processor is coupled to the detection unit. The processor is configured to classify the target object based at least in part on the movement of the target object for use in providing the action of the active safety system.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
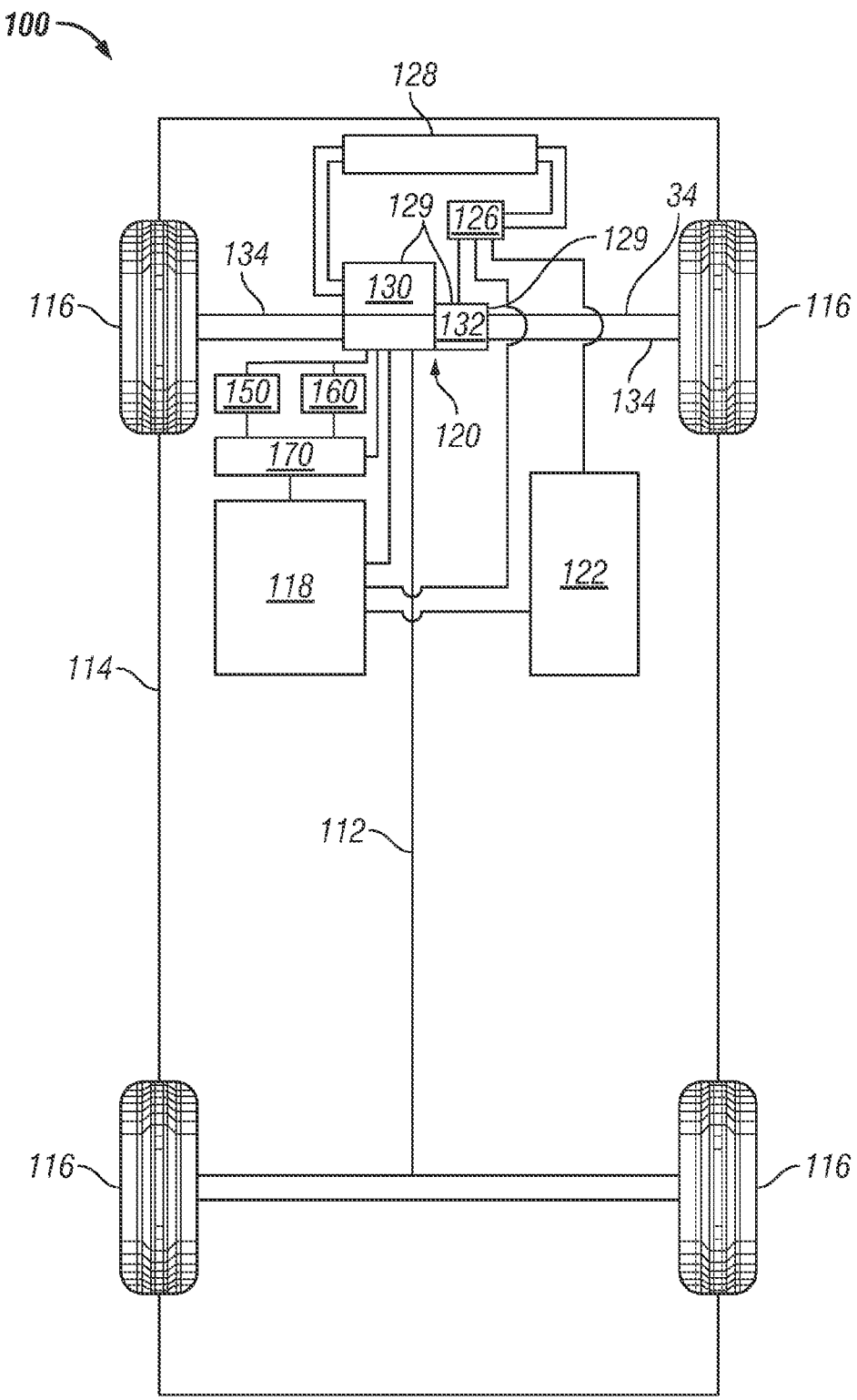
FIG. 1 is a functional block diagram of a vehicle that includes an active safety control system, in accordance with an exemplary embodiment.

FIG. 1 illustrates a vehicle 100, or automobile, according to an exemplary embodiment. The vehicle 100 is also referenced at various points throughout this application as the host vehicle. As described in greater detail further below, the vehicle 100 includes an active safety control system ("ASCS") 170 for identification of objects proximate the host vehicle and for optimized control of active safety functionality for the vehicle 100 that is based at least in part on the identification of the objects proximate the host vehicle.

Figure 6:
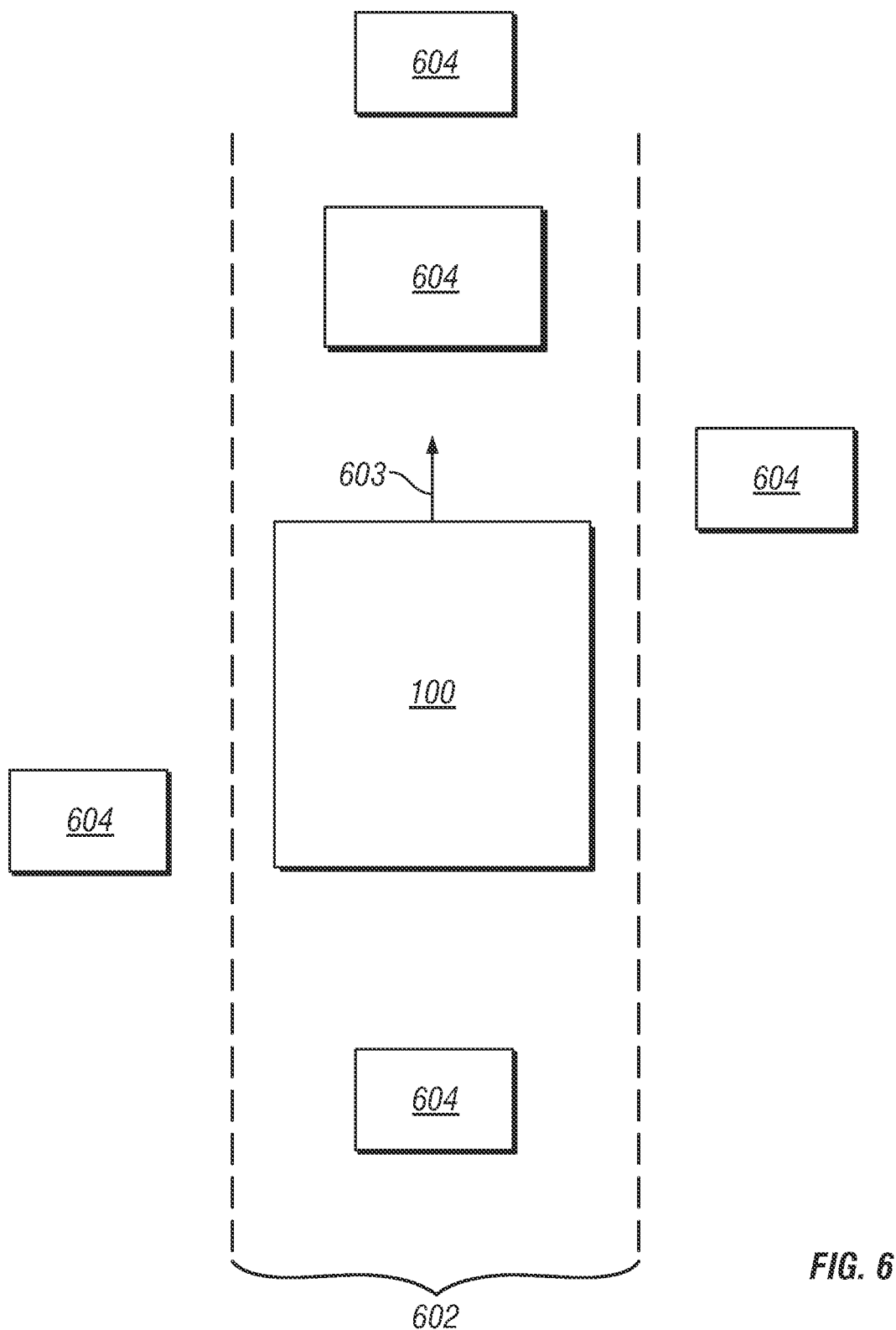
FIG. 6 is a schematic drawing illustration of the vehicle of FIG. 1 travelling within a road lane in proximity to possible objects, in accordance with an exemplary embodiment.

As depicted in FIG. 6, the vehicle 100 is travelling within a lane 602 of a road or other path in a direction 603. The vehicle 100 may be surrounded by one or more objects 604. The objects 604 may comprise other vehicles (such as automobiles), pedestrians, bicycles, and/or other objects, individuals, and/or devices. Such objects (such as the objects 604 depicted in FIG. 6) are referenced at various points throughout this application as objects or target objects.

With reference again to FIG. 1, the vehicle 100 includes a chassis 112, a body 114, four wheels 116, an electronic control system 118, a steering system 150, a braking system 160, and an active safety control system 170. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of electrical propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

In the exemplary embodiment illustrated in FIG. 1, the vehicle 100 is a hybrid electric vehicle (HEV), and further includes an actuator assembly 120, an energy storage system (ESS) 122, a power inverter assembly (or inverter) 126, and a radiator 128. The actuator assembly 120 includes at least one electric propulsion system 129 mounted on the chassis 112 that drives the wheels 116. In the depicted embodiment, the actuator assembly 120 includes a combustion engine 130 and an electric motor/generator (or motor) 132. As will be appreciated by one skilled in the art, the electric motor 132 includes a transmission therein, and, although not illustrated, also includes a stator assembly (including conductive coils), a rotor assembly (including a ferromagnetic core), and a cooling fluid or coolant. The stator assembly and/or the rotor assembly within the electric motor 132 may include multiple electromagnetic poles, as is commonly understood.

Still referring to FIG. 1, the combustion engine 130 and the electric motor 132 are integrated such that one or both are mechanically coupled to at least some of the wheels 116 through one or more drive shafts 134. In one embodiment, the vehicle 100 is a "series HEV," in which the combustion engine 130 is not directly coupled to the transmission, but coupled to a generator (not shown), which is used to power the electric motor 132. In another embodiment, the vehicle 100 is a "parallel HEV," in which the combustion engine 130 is directly coupled to the transmission by, for example, having the rotor of the electric motor 132 rotationally coupled to the drive shaft of the combustion engine 130.

The ESS 122 is mounted on the chassis 112, and is electrically connected to the inverter 126. The ESS 122 preferably comprises a battery having a pack of battery cells. In one embodiment, the ESS 122 comprises a lithium iron phosphate battery, such as a nanophosphate lithium ion battery. Together the ESS 122 and electric propulsion system(s) 129 provide a drive system to propel the vehicle 100.

The radiator 128 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the engine 130 and the inverter 126.

The steering system 150 is mounted on the chassis 112, and controls steering of the wheels 116. The steering system 150 includes a steering wheel and a steering column (not depicted). The steering wheel receives inputs from a driver of the vehicle. The steering column results in desired steering angles for the wheels 116 via the drive shafts 134 based on the inputs from the driver.

The braking system 160 is mounted on the chassis 112, and provides braking for the vehicle 100. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle, as well as various other inputs for various vehicle devices and/or systems, such as one or more vehicle radios, other entertainment systems, environmental control systems, lightning units, navigation systems, and the like (also not depicted).

The ASCS 170 is mounted on the chassis 112. The ASCS 170 may be coupled to various other vehicle devices and systems, such as, among others, the actuator assembly 120, the steering system 150, the braking system 160, and the electronic control system 118. The ASCS 170 identifies objects proximate to the vehicle and provides various active safety controls (including adjustments for active safety systems such as automatic braking systems such as collision preparation systems (CPS), automatic steering systems such as enhanced collision avoidance (ECS) systems, and forward collision alert (FCA) systems) based at least in part on the identification of the objects in proximity to the vehicle. In addition, although not illustrated as such, the ASCS 170 (and/or one or more components thereof) may be integral with the electronic control system 118 and may also include one or more power sources. The ASCS 170 preferably conducts various steps of the process 300 and the steps and sub-processes thereof of FIGS. 3-5.

Figure 2:
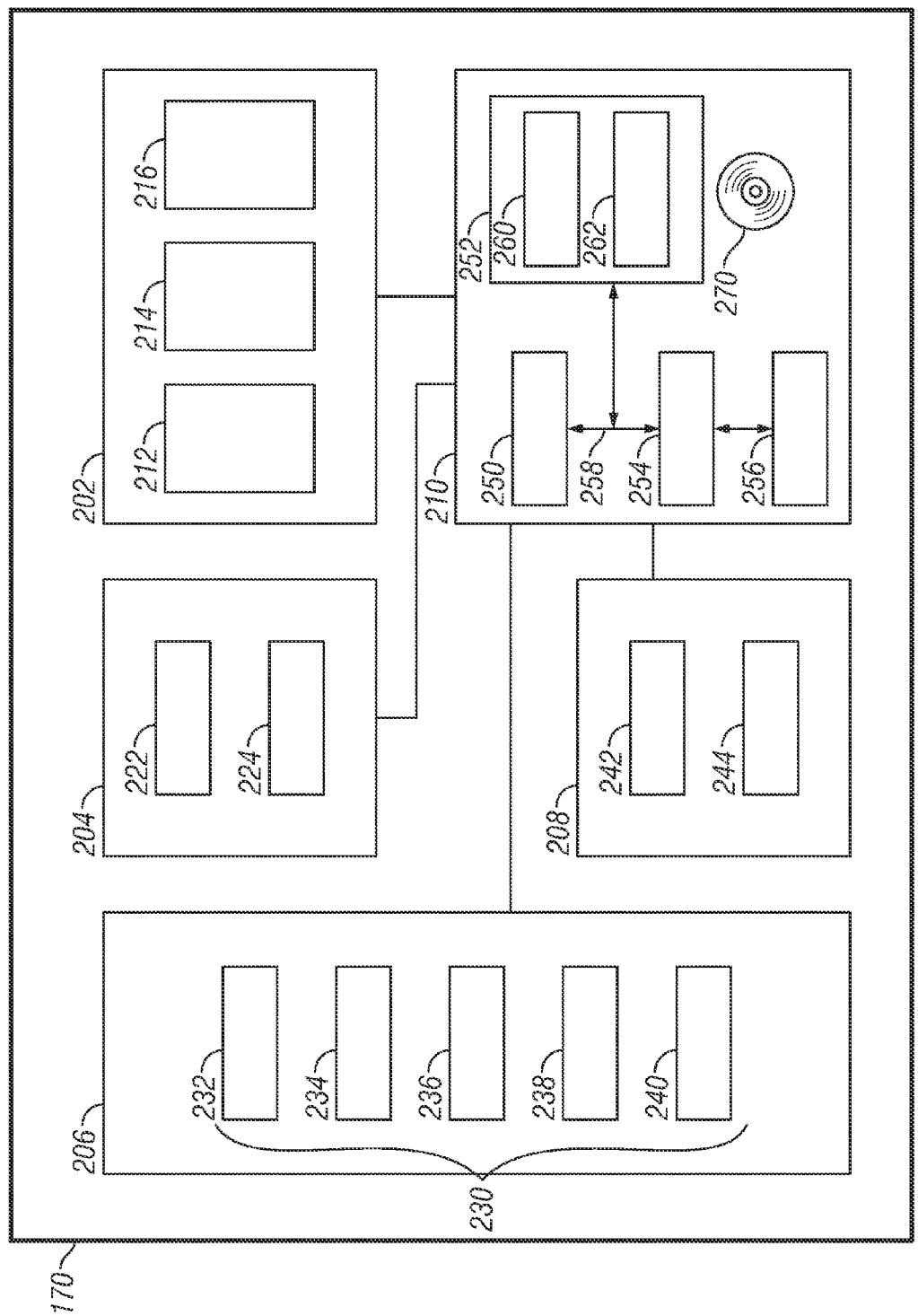
FIG. 2 is a functional block diagram of an active safety control system that can be used in connection with the vehicle of FIG. 1, in accordance with an exemplary embodiment.

With reference to FIG. 2, a functional block diagram is provided for the ASCS 170 of FIG. 1, in accordance with an exemplary embodiment. As depicted in FIG. 2, the ASCS 170 includes an object detection unit 202, a communication unit 204, a sensor array 206, a driver notification unit 208, and a controller 210.

The object detection unit 202 is used to detect objects in proximity to the vehicle, and to obtain information and data pertaining thereto (such as information and data pertaining to position and movement of the objects). The object detection unit 202 provides these various types of information to the controller 210 for processing and for use in identifying/classifying the objects detected by the object detection unit 202 for use in controlling the active safety functionality for the vehicle. In the depicted embodiment, the object detection unit 202 includes one or more cameras 212 and/or other vision-based detection devices, radar devices 214 (such as long and short range radar detection devices), and/or other object detection devices 216 such as, by way of example, light detection and ranging (LIDAR).

The communication unit 204 receives information regarding data as to position, movement, and operation of the vehicle and/or pertaining to objects in proximity to the vehicle. Specifically, in one embodiment, the communication unit 204 receives information as to one or more of the following: driver inputs for an accelerator pedal of the vehicle, driver inputs for a brake pedal of the vehicle, a driver's engagement of a steering wheel of the vehicle, information as to lateral and longitudinal positions, velocities, and accelerations of the vehicle, and information as to lateral and longitudinal positions, velocities, and accelerations of objects in proximity to the vehicle. In one embodiment, the communication unit 204 provides these various types of information to the controller 210 for processing and for use in identifying/classifying the objects detected by the object detection unit 202 for use in controlling the active safety functionality for the vehicle. Per the discussion further below, in certain embodiments, some or all of this information may be provided instead by the sensor array 206.

As used throughout this application, (i) a longitudinal position of a vehicle or object comprises a position of the vehicle or object with respect to a longitudinal direction of movement of the host vehicle; (ii) a longitudinal velocity of a vehicle or object comprises a velocity of the vehicle or object with respect to a longitudinal direction of movement of the host vehicle; and (iii) a longitudinal acceleration of a vehicle or object comprises a component of an acceleration of the vehicle or object with respect to a longitudinal direction of movement of the host vehicle. Also as used throughout this application, (i) a lateral position of a vehicle or object comprises a position of the vehicle or object that is perpendicular to a longitudinal direction of movement of the host vehicle; (ii) a lateral velocity of a vehicle or object comprises a velocity of the vehicle or object that is perpendicular to a longitudinal direction of movement of the host vehicle; and (iii) a lateral acceleration of a vehicle or object comprises a component of an acceleration of the vehicle or object that is perpendicular to a longitudinal direction of movement of the host vehicle.

In the depicted embodiment, the communication unit 204 includes an internal communication device 222 and an external communication device 224. The internal communication device 222 preferably comprises a transceiver configured to receive various of the above information from various other devices and systems of the vehicle, outside of the ASCS 170, via a vehicle communications bus (not depicted). The external communication device 224 preferably comprises a transceiver (such as a vehicle telematics unit and/or a global system (GPS) device) configured to receive various of the above information from a central database and/or from a satellite system via a wireless network (not depicted).

The sensor array 206 measures parameters for data as to operating conditions and usage of the vehicle. Specifically, in one embodiment, the sensor array 206 comprises various sensors 230 that measure values of parameters pertaining to one or more of the following: driver inputs for an accelerator pedal of the vehicle, driver inputs for a brake pedal of the vehicle, a driver's engagement of a steering wheel of the vehicle, and information as to lateral and longitudinal positions, velocities, and accelerations of the vehicle, and information as to lateral and longitudinal positions, velocities, and accelerations of objects in proximity to the vehicle.

In one embodiment, the sensor array 206 provides these various types of information to the controller 210 for processing and for use in identifying/classifying the objects detected by the object detection unit 202 for use in controlling the active safety functionality for the vehicle. Per the discussion above, in certain embodiments, some or all of this information may be provided instead by the communication unit 204. As depicted in FIG. 2, the sensor array 206 includes one or more brake pedal sensors 232, accelerator pedal sensors 234, steering angle sensors 236, wheel speed sensors 238, yaw rate sensors, and/or accelerometers 240.

The brake pedal sensors 232 are coupled to or part of the braking system 160 of FIG. 1. The brake pedal sensors 232 include one or more brake pedal position sensors and/or brake pedal travel sensors. The brake pedal position sensor measures a position of the brake pedal or an indication as to how far the brake pedal has traveled when the operator applies force to the brake pedal. The brake pedal force sensor measures an amount of force applied to the brake pedal by the driver of the vehicle.

The accelerator pedal sensors 234 are coupled to an accelerator pedal of the vehicle. The accelerator pedal sensors 234 include one or more accelerator pedal position sensors and/or accelerator pedal travel sensors. The accelerator pedal position sensor measures a position of the accelerator pedal or an indication as to how far the accelerator pedal has traveled when the operator applies force to the accelerator pedal. The accelerator pedal force sensor measures an amount of force applied to the accelerator pedal by the driver of the vehicle.

The steering angle sensors 236 are coupled to or part of the steering system 150 of FIG. 1, and are preferably coupled to a steering wheel or steering column thereof. The steering angle sensors 236 measure an angular position of the steering column and/or steering wheel or an indication as to how far the steering column is turned when the operator applies force to a steering wheel of the steering column.

The wheel speed sensors 238 are coupled to one or more of the wheels 116 of FIG. 1. The wheel speed sensors 238 measure wheel speeds of the wheels 115 while the vehicle is being operated. In one embodiment, each wheel speed sensor 238 measures a speed (or velocity) of a different respective wheel 116.

The accelerometers 240 measure an acceleration of the vehicle. In certain embodiments, the accelerometers measure lateral and longitudinal acceleration of the vehicle. In certain other embodiments, vehicle acceleration values are instead calculated by the controller 210 using velocity values, for example as calculated using the wheel speed values obtained from the wheel speed sensors 238.

The driver notification unit 208 provides notifications/alerts/warnings to the driver and other occupants of the vehicle when an object is identified in proximity to the vehicle as potentially posing a threat to the vehicle. In one embodiment, the display unit provides notifications/alerts/warnings when an expected or calculated time to collision between an object and the vehicle is less than one or more predetermined thresholds that are preferably stored in the memory 252 of FIG. 2 as stored values 262 thereof.

In the depicted embodiment, the driver notification unit 208 includes an audio component 242 and a visual component 244. The audio component 242 provides audio notifications/alerts/warnings (such as an audible alarm, a beeping sound, or a verbal description that an object is nearby or a collision may be imminent) to the driver and/or other occupants of the vehicle. The visual component 244 provides visual notifications/alerts/warnings (such as an illuminated light, a flashing light, or a visual description that an object is nearby or a collision may be imminent) to the driver and/or other occupants of the vehicle.

The controller 210 is coupled to the object detection unit 202, the communication unit 204, the sensor array 206, and the driver notification unit 208. The controller 210 processes the data and information received from the object detection unit 202, the communication unit 204, and the sensor array 206. Specifically, the controller 210 identifies/classifies objects in proximity to the vehicle that are detected by the object detection unit 202 using data and information obtained from the object detection unit 202, the communication unit 204, and/or the sensor array 206. The controller 210 also utilizes the identification/classification of the objects in proximity to the vehicle to provide appropriate notifications/alerts/warnings via instructions provided to the driver notification unit 208 and also to control one or more aspects of active safety control (such as automatic steering and/or automatic braking) via instructions provided to the steering system 150 and/or the braking system 160 of FIG. 1. In a preferred embodiment, the controller 210 performs these functions in accordance with steps of the process 300 (and sub-processes and/or sub-steps thereof) described further below in connection with FIGS. 3-5.

As depicted in FIG. 2, the controller 210 comprises a computer system. In certain embodiments, the controller 210 may also include one or more of the object detection unit 202, the communication unit 204, the sensor array 206, the driver notification unit 208, and/or components thereof. In addition, it will be appreciated that the controller 210 may otherwise differ from the embodiment depicted in FIG. 2. For example, the controller 210 may be coupled to or may otherwise utilize one or more remote computer systems and/or other control systems.

In the depicted embodiment, the computer system of the controller 210 includes a processor 250, a memory 252, an interface 254, a storage device 256, and a bus 258. The processor 250 performs the computation and control functions of the controller 210, and may comprise any type of processor or multiple processors, single integrated circuits such as a microprocessor, or any suitable number of integrated circuit devices and/or circuit boards working in cooperation to accomplish the functions of a processing unit. During operation, the processor 250 executes one or more programs 260 contained within the memory 252 and, as such, controls the general operation of the controller 210 and the computer system of the controller 210, preferably in executing the steps of the processes described herein, such as the steps of the process 300 (and any sub-processes thereof) in connection with FIGS. 3-5.

The memory 252 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 252 is located on and/or co-located on the same computer chip as the processor 250. In the depicted embodiment, the memory 252 stores the above-referenced program 260 along with one or more stored values 262 for use in identifying/classifying objects in proximity to the vehicle and controlling active safety functionality for the vehicle.

The bus 258 serves to transmit programs, data, status and other information or signals between the various components of the computer system of the controller 210. The interface 254 allows communication to the computer system of the controller 210, for example from a system driver and/or another computer system, and can be implemented using any suitable method and apparatus. It can include one or more network interfaces to communicate with other systems or components. The interface 254 may also include one or more network interfaces to communicate with technicians, and/or one or more storage interfaces to connect to storage apparatuses, such as the storage device 256.

The storage device 256 can be any suitable type of storage apparatus, including direct access storage devices such as hard disk drives, flash systems, floppy disk drives and optical disk drives. In one exemplary embodiment, the storage device 256 comprises a program product from which memory 252 can receive a program 260 that executes one or more embodiments of one or more processes of the present disclosure, such as the steps of the process 300 (and any sub-processes thereof) of FIGS. 3-5, described further below. In another exemplary embodiment, the program product may be directly stored in and/or otherwise accessed by the memory 252 and/or a disk (e.g., disk 270), such as that referenced below.

The bus 258 can be any suitable physical or logical means of connecting computer systems and components. This includes, but is not limited to, direct hard-wired connections, fiber optics, infrared and wireless bus technologies. During operation, the program 260 is stored in the memory 252 and executed by the processor 250.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 250) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 210 may also otherwise differ from the embodiment depicted in FIG. 2, for example in that the computer system of the controller 210 may be coupled to or may otherwise utilize one or more remote computer systems and/or other control systems.

Figure 3:
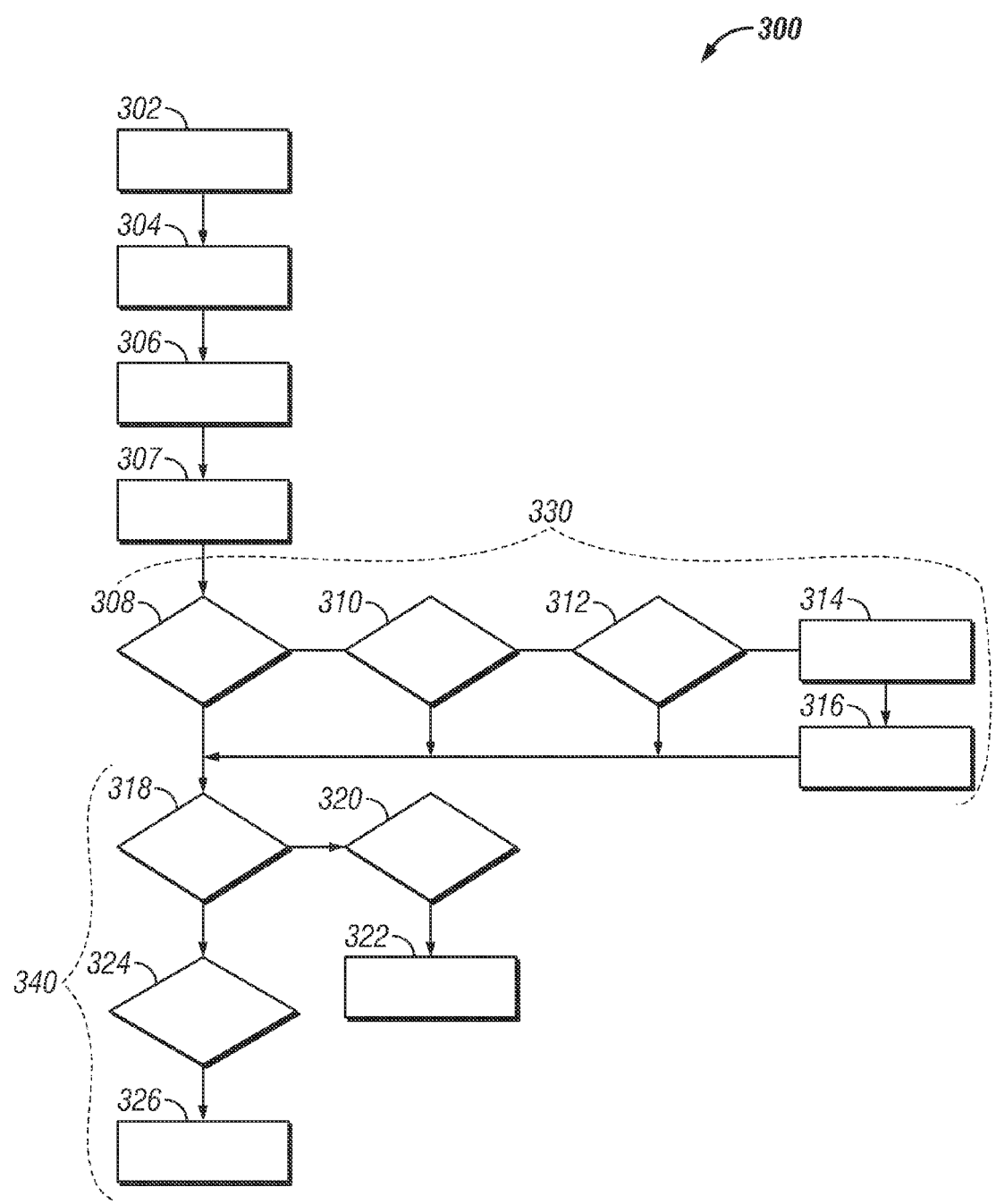
FIG. 3 is a flowchart of a process for identifying objects in proximity to a vehicle and controlling an active safety control system of the vehicle, and that can be used in connection with the vehicle of FIG. 1 and the active safety control system of FIGS. 1 and 2, in accordance with an exemplary embodiment.

FIG. 3 is a flowchart of a process 300 for identifying objects in proximity to a vehicle and controlling an active safety control system of the vehicle, in accordance with an exemplary embodiment. The process 300 will also be described further below in connection with FIGS. 4 and 5, which depict exemplary sub-processes thereof. The process 300 can be used in connection with the vehicle 100 of FIGS. 1 and 6, the ASCS 170 of FIG. 1, and objects such as the target objects 604 of FIGS. 6 and 2. References to the vehicle or host vehicle herein may pertain to the vehicle 100 of FIGS. 1 and 6 (including the ASCS 170 of FIGS. 1 and 2), and references to the target object may pertain to the target objects 604 (or similar target objects, which may vary in placement from those depicted in FIG. 6), in accordance with an exemplary embodiment. The process 300 is preferably performed continuously during a current drive cycle (or ignition cycle) of the vehicle.

The process includes the step of obtaining vehicle data (step 302). The vehicle data preferably includes data and related information pertaining to lateral and longitudinal positions, velocities, and accelerations of the vehicle (preferably pertaining to measurements of one or more sensors 230, such as the wheel speed sensors 238 and/or accelerometers 240 of FIG. 2 and/or via communications provided by the communication unit 204 of FIG. 2), as well as measures of a driver's engagement of a brake pedal, accelerator pedal, and steering wheel of the vehicle (preferably pertaining to measurements of various sensors 230, such as the brake pedal sensors 232, the accelerator pedal sensors 234, and the steering angle sensors 236 of FIG. 2, respectively and/or via communications provided by the communication unit 204 of FIG. 2), in addition to data and information pertaining to a direction of travel of the vehicle as well as systems and algorithms being run in the vehicle (preferably via communications provided by the communication unit 204 of FIG. 2). The vehicle data of step 302 is gathered throughout the drive cycle of the vehicle, preferably continuously, and provided to the processor 250 of FIG. 2 for processing.

An object is detected in proximity to the vehicle (step 304). The object (also referred to herein as the target and/or the target object) is preferably detected by the object detection unit 202 of FIG. 2, most preferably by one or more of the cameras 212, radar devices 214, and/or other devices 216 thereof. Information and data pertaining to the detected target object are also obtained (step 306). The target object data preferably includes data and related information pertaining to lateral and longitudinal positions, lateral and longitudinal velocities, and lateral and longitudinal accelerations of the target object. This information and data is preferably obtained via the object detection unit 202 of FIG. 2, most preferably by one or more of the cameras 212, radar devices 214, and/or other devices 216 thereof, and provided to the processor 250 of FIG. 2 for processing. In addition, the processor 250 of FIG. 2 assigns a unique pseudo-random identifier for each such detected target object. The target object data of step 306 is gathered throughout the drive cycle of the vehicle, preferably continuously.

Various determinations and calculations are also performed (step 307). The determinations and calculations utilize the vehicle data of step 302 and the target object data of step 306, and yield calculated results pertaining to lateral and longitudinal positions, velocities, and accelerations of the vehicle, lateral and longitudinal positions, velocities, and accelerations of the target object, and relative lateral and longitudinal positions, velocities, and accelerations between the target object and the vehicle. The calculations and determinations of step 307 are preferably performed by the processor 250 of FIG. 2 throughout the drive cycle of the vehicle, preferably continuously, and are utilized by the processor 250 of FIG. 2 for further processing in identifying/classifying the target object and controlling one or more active safety features, such as described below.

In one embodiment, a determination is made as to whether the target object was detected by a camera 212 of the object detection unit 202 of FIG. 2 (step 308). This determination is preferably made by the processor 250 of FIG. 2. If it is determined that the target object was detected by a camera 212, the process proceeds directly to step 318, described further below. In another embodiment, the process proceeds to step 310 regardless of whether the target object was detected by a camera.

Conversely, in one embodiment, if it is determined that the target object was not detected by a camera 212 (for example, if the target object was detected only by some other, non-camera device of the object detection unit 202 of FIG. 2), then a determination is made as to whether the target object is classified as a motor vehicle (step 310). This determination is preferably made by the processor 250 of FIG. 2. If it is determined that the target object is not a vehicle, the process proceeds directly to step 318, described further below.

Conversely, if it is determined that the target object is a vehicle, a determination is made as to whether a time to collision between the target object and the vehicle is less than a predetermined threshold (step 312). This determination is preferably made by the processor 250 of FIG. 2. The predetermined threshold comprises a value or point at which significant evasive action is needed to avoid a collision, for example a braking action exceeding 0.55 G's or a steering action exceeding 0.3 G's (with "G", as used throughout this application, representing the acceleration of gravity, or 9.8 meters per second squared ($m/s^2$). The predetermined threshold is preferably stored in the memory 252 of FIG. 2 as a stored value 262 thereof. If it is determined that the time to collision is less than the predetermined threshold, the process proceeds directly to step 318, described further below.

Conversely, if it is determined that the time to collision is less than or equal to the predetermined threshold, a warning is provided (step 314). The warning preferably comprises an audio and/or visual warning (such as a verbal and/or audible notification of a possible imminent collision) provided by the driver notification unit 208 of FIG. 2. In addition, one or more remedial actions may also be taken (step 316). Such remedial actions may include initiation of automatic steering actions using the steering system 150 of FIG. 1 and/or initiating automatic braking actions using the braking system 160 of FIG. 1, based on instructions provided thereto by the processor 250 of FIG. 2. The process then proceeds to step 318, described further below. In addition, in certain embodiments, a notation may be stored in the memory 252 of FIG. 1 indicating that the target object appears to be a vehicle that was detected by a radar, a sensor, and/or another device but not by a camera, so that the target object may potentially be treated differently (for example, requiring additional redundancy checks) in the implementation of active safety functionality.

Steps 308-316 provide for additional monitoring of target objects in situations in which the object detection unit 202 of FIG. 2 does not include a camera 212, or in situations in which a camera 212 is not functioning properly and/or the target object is not readily detectible via a camera 212 (such as when a line of sight between the target object and the vehicle is blocked, for example by another vehicle and/or object). In one embodiment, the algorithm of steps 308-316 is performed regardless of whether or not the camera detected the object.

As referenced in FIG. 3, steps 308-316 are denoted as representing a first sub-process 330 of the process 300. Various steps of the first sub-process 330 are depicted in FIG. 4 and are described directly below in connection therewith.

Figure 4:
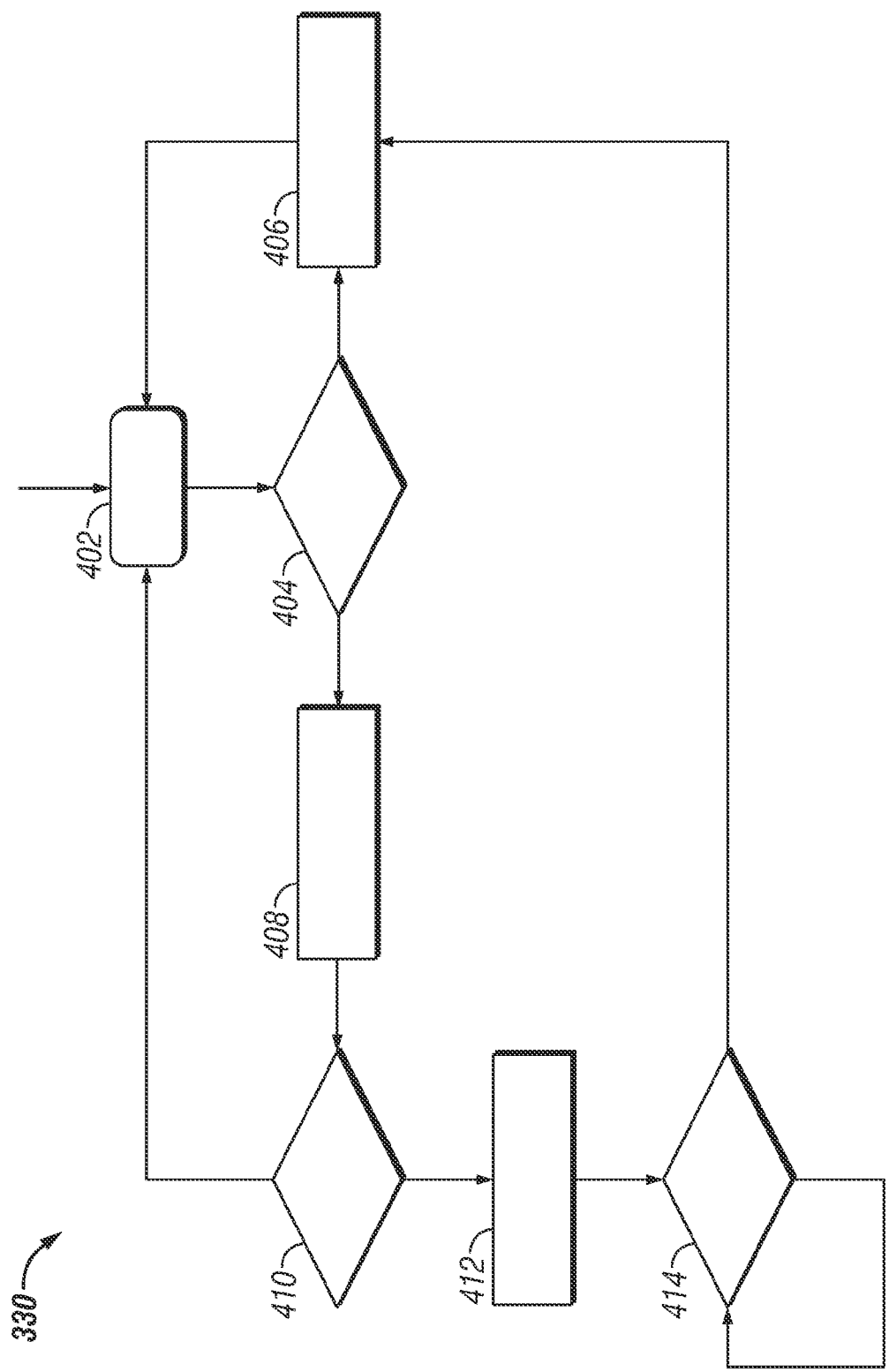
FIG. 4 is a flowchart of a sub-process of the process of FIG. 3, namely, the sub-process of classifying an object as a target vehicle in proximity to the host vehicle, and controlling active safety functionality of the vehicle accordingly, in accordance with an exemplary embodiment.

As depicted in FIG. 4, the first sub-process 330 of FIG. 3 begins with a presumption that the target object is not a motor vehicle (step 402). Specifically, an inferred vehicle value is set to an initial value of "false", indicating that the target object is not considered to be a motor vehicle. The inferred vehicle value maintains this value of "false" unless and until the steps described below provide a sufficient indication that the target object is a motor vehicle (or a motorized vehicle). The inferred vehicle value is preferably set by the processor 250 of FIG. 2.

Determinations are made as to whether all entry conditions are met that would indicate that the target object may be a motor vehicle (step 404). These determinations are preferably made by the processor 250 of FIG. 2, most preferably continuously, throughout the drive cycle, based on the data and information of steps 302-307 of FIG. 3.

In a preferred embodiment, eight entry conditions are utilized in step 404, as described below. The first entry condition is whether an object identifier number assigned to the target object remains constant. The object identifier number pertains to the pseudo-random number assigned to the target object by the processor 250 of FIG. 2 during step 306 of FIG. 3.

The second entry condition is whether an absolute value of relative longitudinal velocity between the target object and the host vehicle is less than a predetermined threshold. The relative longitudinal velocity preferably comprises a difference between (i) a component of the velocity of the target object with respect to a longitudinal direction of movement of the host vehicle and (ii) a component of the longitudinal velocity of the host vehicle in the direction of movement of the host vehicle. This predetermined threshold is preferably stored in the memory 252 of FIG. 2 as a stored value 262 thereof. In one preferred embodiment, this predetermined threshold is equal to five meters per second (5.0 m/s). The relative longitudinal velocity is preferably calculated by the processor 250 of FIG. 2 during step 307 of FIG. 3.

The third entry condition is whether an absolute value of relative lateral velocity between the target object and the host vehicle is less than a predetermined threshold. This predetermined threshold is preferably stored in the memory 252 of FIG. 2 as a stored value 262 thereof. In one preferred embodiment, this predetermined threshold is equal to two meters per second (2.0 m/s). The relative lateral velocity is preferably calculated by the processor 250 of FIG. 2 during step 307 of FIG. 3.

The fourth entry condition is whether the target object is moving in the same direction as the host vehicle. The directions of the host vehicle and the target object used for this comparison are preferably calculated by the processor 250 of FIG. 2 during steps 302 and 306, respectively, of FIG. 3.

The fifth entry condition is whether the target object is actively measured by the object detection unit. Specifically, the fifth entry condition preferably is satisfied when one or more of the devices 212, 214, and/or 216 of the object detection unit 202 of FIG. 2 are actively measuring the target object without interruption.

The sixth entry condition is whether an absolute value of a lateral lane offset between the target object and the vehicle is less than a predetermined threshold. This predetermined threshold is preferably stored in the memory 252 of FIG. 2 as a stored value 262 thereof. In one preferred embodiment, this predetermined threshold is equal to 5.4 meters. The absolute value of the lateral lane offset is preferably calculated by the processor 250 of FIG. 2 during step 307 of FIG. 3.

The seventh entry condition is whether a velocity of the host vehicle is greater than a predetermined threshold. This predetermined threshold is preferably stored in the memory 252 of FIG. 2 as a stored value 262 thereof. In one preferred embodiment, this predetermined threshold is equal to 10 meters per second (10.0 m/s). The velocity of the host vehicle is preferably calculated or obtained by the processor 250 of FIG. 2 during step 302 of FIG. 3.

The eighth entry condition is whether the data and information pertaining to the target object pass one or more plausibility checks. By way of example, the plausibility checks may include determinations as to whether changes in position, lateral offset, and velocity pertaining to the target object and/or relative to the host vehicle remain within ranges that are plausible for the target object. The plausibility checks are preferably performed by the processor 250 of FIG. 2 during step 307 of FIG. 3.

If one or more of the entry conditions of step 404 are not satisfied, a counter for the inferred vehicle value is set (or re-set) to the "false" position (step 406), indicating that the target object is not a motor vehicle. This setting (or re-setting) of the counter is preferably made by the processor 250 of FIG. 2.

Conversely, if each of the entry conditions of step 404 are satisfied, then this serves as an indication that the target object may be a vehicle. Accordingly, the above-referenced counter for the inferred vehicle value is incremented (step 408). The counter is preferably incremented by the processor 250 of FIG. 2. If at any time any of the entry conditions of step 404 are no longer satisfied, the process proceeds instead to step 406, and the counter is re-set back equal to the "false" value indicating that the target object is not a motor vehicle.

After the counter is incremented in step 408, a determination is made as to whether the counter is greater than a predetermined threshold (step 410). This determination is preferably made by the processor 250 of FIG. 2. The counter is preferably greater than the predetermined threshold when each of the entry conditions of step 404 have been satisfied, continuously, for at least a predetermined amount of time. The predetermined threshold for the counter of step 410 (and/or the predetermined amount of time required for the entry conditions to be satisfied in a continuous manner) is preferably stored in the memory 252 of FIG. 2 as a stored value 262 thereof. In one embodiment, this predetermined amount of time is equal to approximately three seconds. However, this may vary in other embodiments.

If it is determined in step 410 that the counter is not yet greater than the predetermined threshold (and/or that each of the entry conditions of step 404 has not yet been satisfied continuously for at least the predetermined amount of time), then the process proceeds to step 402, as the inferred vehicle value remains equal to "false" (indicating that the target object has not yet been determined to be a motor vehicle), but the counter is not re-set (as the determinations thus far would have indicated that the target object may be a motor vehicle). Steps 402-410 then repeat until a determination is made in a subsequent iteration of step 410 that the counter is greater than the predetermined threshold (and/or that each of the entry conditions of step 404 have been satisfied continuously for at least the predetermined amount of time).

If it is determined in step 410 that the counter is greater than the predetermined threshold (and/or that each of the entry conditions of step 404 have been satisfied continuously for at least the predetermined amount of time), then the inferred vehicle value is set equal to "true" (step 412). Specifically, during step 412, the target object is classified as a motor vehicle.

Determinations are made as to whether any exit conditions are met that would indicate that the target object is not a motor vehicle (step 414). These determinations are preferably made by the processor 250 of FIG. 2, preferably continuously, throughout the drive cycle, based on the data and information of steps 302-307 of FIG. 3.

In a preferred embodiment, six exit conditions are utilized in step 414, as described below. The first exit condition is whether the target object (and/or data or information pertaining thereto) is no longer actively measured and/or reported to the processor 250 of FIG. 1 by the object detection unit (such as by one or more of the devices 212, 214, and/or 216 of the object detection unit 202 of FIG. 2).

The second exit condition is whether the target object is moving in the opposite direction as the host vehicle. This determination is preferably made using the directions of the host vehicle and the target object as calculated by the processor 250 of FIG. 2 during steps 302 and 306, respectively, of FIG. 3.

The third exit condition is whether any additional sensor returns are reported in close proximity to the target object. Specifically, the third exit condition is satisfied when one or more devices 212, 214, and/or 216 of the object detection unit 202 of FIG. 2 provide conflicting measurements, data, and/or information pertaining to the target object. By way of example, the third exit condition is satisfied if one of the devices 212, 214, and/or 216 of the object detection unit 202 of FIG. 2 provides an indication that the target object (the inferred vehicle) is in close proximity to another target object. This prevents the inferred vehicle status from being inadvertently transferred to another target object.

The fourth exit condition is whether the object identifier number assigned to the target object changes. Specifically, the fourth exit condition is satisfied when a change occurs to the pseudo-random number assigned to the target object by the processor 250 of FIG. 2 during step 306 of FIG. 3.

The fifth exit condition is whether the absolute value of a lateral lane offset between the target object and the vehicle (preferably, as calculated by the processor 250 of FIG. 2 during step 307 of FIG. 3) is greater than a predetermined threshold. This predetermined threshold is preferably stored in the memory 252 of FIG. 2 as a stored value 262 thereof. In one preferred embodiment, this predetermined threshold is equal to 5.4 meters.

The sixth exit condition is whether the target object fails one or more plausibility checks. Similar to those described above in connection with the entry conditions of step 404, the plausibility checks of step 414 may include determinations as to whether changes in position, lateral offset, and velocity pertaining to the target object and/or relative to the host vehicle remain within ranges of vehicles that are plausible for the target object. The plausibility checks are preferably performed by the processor 250 of FIG. 2 during step 307 of FIG. 3.

If one or more of the exit conditions of step 414 are satisfied, then the process proceeds to the above-referenced step 406, and the counter for the inferred vehicle value is set (or re-set) to the "false" position, indicating that the target object is not a motor vehicle. This setting (or re-setting) of the counter is preferably made by the processor 250 of FIG. 2. The process then returns to step 402 for the beginning of a new iteration.

Conversely, if none of the exit conditions of step 414 are satisfied, then the target object remains classified as a motor vehicle. The determinations of step 414 thereafter continue, preferably continuously, during the driving cycle so long as none of the exit conditions of step 414 are satisfied.

Returning to FIG. 3, during step 318, a determination is made as to whether the target object comprises an individual that is not in a motor vehicle. In one embodiment, this determination comprises a determination as to whether the target object comprises a pedestrian or a bicycle, and/or a similar-type device (by way of example, including a unicycle, stroller, wagon, skateboard, or the like). This determination is preferably made by the processor 250 of FIG. 2.

If the target object does not comprise an individual not in a motor vehicle (for example, if the target object comprises an automobile or other motor vehicle), then active system functionality is utilized in accordance with one or more first thresholds (steps 320 and 322). Specifically, a time to collision is calculated (step 320), preferably by the processor 250 of FIG. 2. In addition, an active safety action is taken if the time to collision is less than a first predetermined threshold (step 322). The first predetermined threshold is preferably stored in the memory 252 of FIG. 2 as a stored value 262 thereof. In a preferred embodiment, the active safety action comprises the application of automatic braking using the braking system 160 of FIG. 1 based on instructions provided thereto by the processor 250 of FIG. 2, so as to provide a first rate of deceleration for the vehicle. In one embodiment, this first predetermined time to collision threshold is equal to a point or value at which a majority of drivers would have initiated an aggressive avoidance maneuver of some kind. In one such embodiment, this predetermined threshold represents a time to collision between 0.5 to 1.5 seconds. However, this predetermined threshold may vary, and is also preferably dependent upon the speed of the host vehicle.

Conversely, if the target object comprises an individual not in a motor vehicle (for example, if the target object comprises a pedestrian and/or an individual riding a bicycle or similar device), then active system functionality is utilized in accordance with one or more second thresholds (steps 324 and 326). Specifically, a time to collision is calculated (step 324), preferably by the processor 250 of FIG. 2. In addition, an active safety action is taken if the time to collision is less than a second predetermined threshold (step 326). The second predetermined threshold is preferably stored in the memory 252 of FIG. 2 as a stored value 262 thereof. In a preferred embodiment, the active safety action comprises the application of automatic braking using the braking system 160 of FIG. 1 based on instructions provided thereto by the processor 250 of FIG. 2, so as to provide a second rate of deceleration for the vehicle. In one embodiment, this second time to collision threshold is approximately between 0.7 and 1.3 seconds for the time to collision. However, this may vary in other embodiments.

The second predetermined threshold utilized in steps 324 and 326 is greater than the first predetermined threshold utilized in steps 320 and 322. In addition, the magnitude of the second deceleration of steps 324 and 326 is less than that of the first deceleration of steps 320 and 322. Accordingly, if the target object is classified as an individual not in a motor vehicle (such as a pedestrian or an individual on a bicycle), automatic braking is applied relatively earlier, but with a relatively lesser amount of deceleration, as compared with situations in which the target object is determined to be a motor vehicle.

Thus, steps 318-326 provide an earlier active safety response and an earlier warning to the driver of the host vehicle when the target object is an individual not in a motor vehicle and a collision is likely. The driver can then also have relatively more time to take his or her own safety measures as appropriate. As referenced in FIG. 3, steps 318-326 are denoted as representing a second-process 340 of the process 300.

Figure 5:
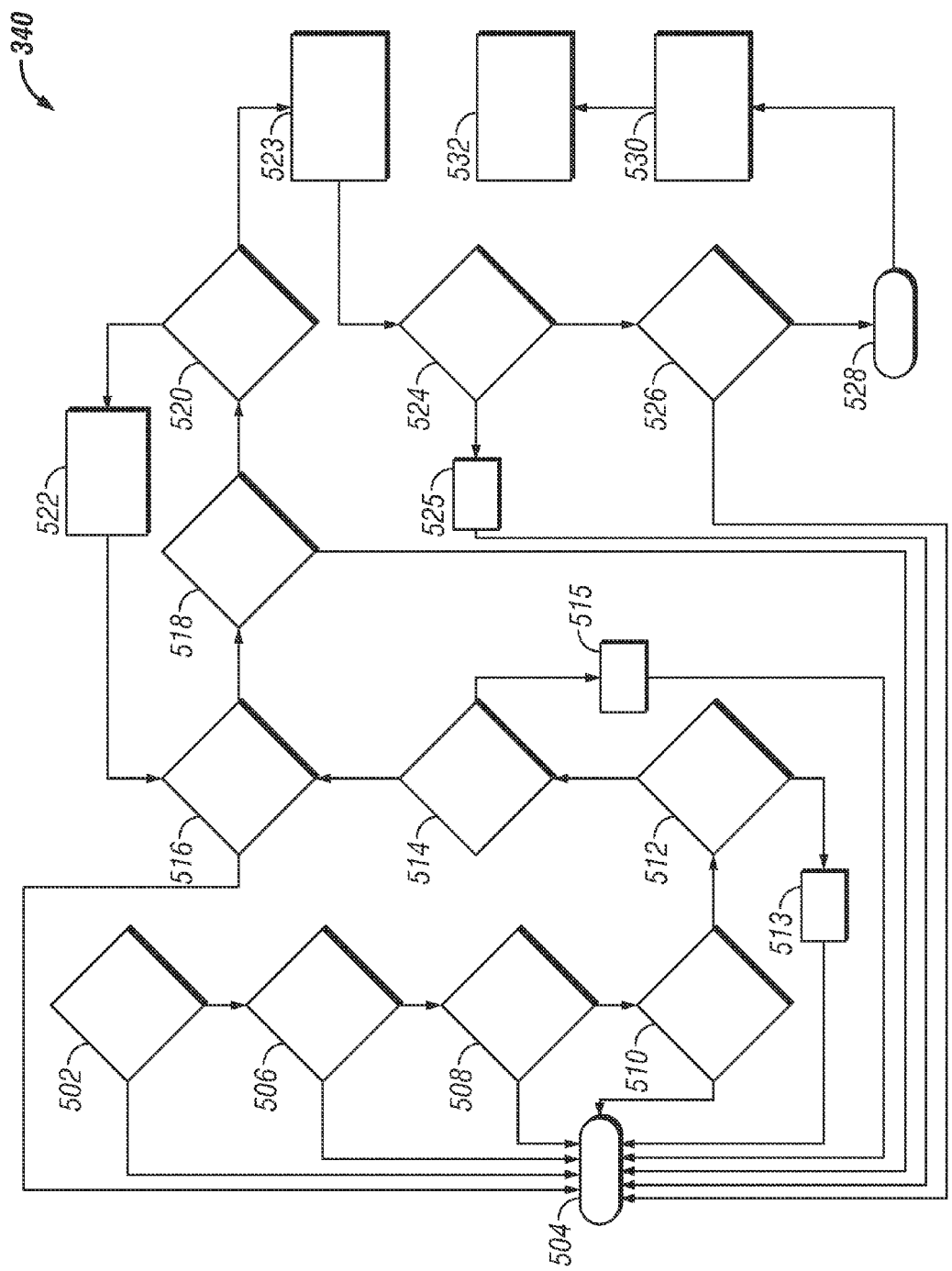
FIG. 5 is a flowchart of another sub-process of the process of FIG. 3, namely, the sub-process of classifying an object as comprising an individual not in a motor vehicle, in proximity to the host vehicle, in accordance with an exemplary embodiment.

Various steps of the second sub-process 340 are depicted in FIG. 5 and are described directly below in connection therewith. During the second sub-process 340 depicted in FIG. 5, active safety functionality is implemented in connection with an adjusted set of calibrations or active safety thresholds (preferably, including adjusted thresholds for an initiation of automatic braking and a host vehicle deceleration rate for the automatic braking) when the target object is classified as a pedestrian that is not in a motor vehicle (for example, when the target object is classified as a pedestrian, a bicycle, or a similar device).

As depicted in FIG. 5, a determination is made as to whether a range (or distance) between the host vehicle and the target object is less than a predetermined threshold (step 502). This determination is preferably made by the processor 250 of FIG. 2 based on calculations made during steps 302-307 of FIG. 3. This threshold is preferably stored in the memory 252 of FIG. 2 as one of the stored values 262 thereof. In one embodiment, this predetermined threshold is equal to approximately 20 meters. However, this may vary in other embodiments.

If it is determined in step 502 that the range between the host vehicle and the target object is greater than or equal to the threshold of step 502, then the adjusted set of active safety thresholds are not implemented (step 504). During step 504, the standard or typical active safety thresholds are utilized, consistent with the target object being classified as a motor vehicle rather than a pedestrian, a bicycle, or the like. Specifically, in a preferred embodiment, during step 504, automatic braking is provided at a first magnitude, to thereby attain a first rate of deceleration for the vehicle, if the calculated time to collision between the target object and the vehicle is less than a first predetermined threshold.

Conversely, if it is determined in step 502 that the range between the host vehicle and the target object is less than the threshold of step 502, then a determination is made as to whether a time to collision between the host vehicle and the target object is less than a predetermined threshold (step 506). This determination is preferably made by the processor 250 of FIG. 2 based on calculations made during steps 302-307 of FIG. 3. This threshold is preferably stored in the memory 252 of FIG. 2 as one of the stored values 262 thereof. In one embodiment, this predetermined threshold is approximately within a range of between 0.7 and 1.3 seconds for the time to collision. However, this may vary in other embodiments. If it is determined in step 506 that the time to collision is greater than or equal to the predetermined threshold of step 506, then the process proceeds to the above-referenced step 504, in which the standard or typical active safety thresholds apply (and the adjusted set of active safety thresholds are not implemented).

Conversely, if it is determined in step 506 that the time to collision is less than the predetermined threshold of step 506, then a determination is made as to whether a collision is likely between the host vehicle and the target object based on their respective trajectories (step 508). In one embodiment, in order to determine whether a collision is likely, the time to collision is multiplied (preferably by the processor 250 of FIG. 2) by the lateral velocities of the host vehicle and the target object to ascertain the projected lateral positions of the host vehicle and the target object. If a resulting relative lateral position of the target object with respect to the host vehicle is within a half-width of the host vehicle (for example, around 1.1 meters, for some vehicles), then a collision is considered to be likely. This determination is preferably made by the processor 250 of FIG. 2 based on calculations made during steps 302-307 of FIG. 3. If it is determined in step 508 that a collision between the host vehicle and the target object is unlikely, then the process proceeds to the above-referenced step 504, in which the standard or typical active safety thresholds apply (and the adjusted set of active safety thresholds are not implemented).

Conversely, if it is determined in step 508 that a collision between the host vehicle and the target object is likely, then a determination is made as to whether the velocity of the host vehicle is less than a predetermined threshold (step 510). This determination is preferably made by the processor 250 of FIG. 2 based on calculations made during steps 302-307 of FIG. 3. This threshold is stored in the memory 252 of FIG. 2 as one of the stored values 262 thereof. In one embodiment, this predetermined threshold is equal to approximately ten meters per second (m/s). However, this may vary in other embodiments. If it is determined in step 510 that the velocity of the host vehicle is greater than or equal to the predetermined threshold of step 510, then the process proceeds to the above-referenced step 504, in which the standard or typical active safety thresholds apply (and the adjusted set of active safety thresholds are not implemented).

Conversely, if it is determined in step 510 that the velocity of the host vehicle is less than the predetermined threshold of step 510, then a determination is made as to whether a position of the accelerator pedal is greater than a predetermined threshold (step 512). This determination is preferably made by the processor 250 of FIG. 2 based on calculations made during steps 302-307 of FIG. 3 using measurements obtained from the accelerator pedal sensors 234 of FIG. 2. This threshold is stored in the memory 252 of FIG. 2 as one of the stored values 262 thereof. In one embodiment, this predetermined threshold is equal to approximately twenty five percent (25%) to forty percent (40%) of full travel or engagement of the accelerator pedal. However, this may vary in other embodiments. In certain embodiments, a similar determination may be made with respect to a measure of movement of the accelerator pedal and/or a measure of force applied to the accelerator pedal by a driver of the vehicle, instead of or in addition to the accelerator pedal position If it is determined in step 512 that the position of the accelerator pedal is greater than or equal to the predetermined threshold of step 512 (and/or that the movement and/or force applied to the accelerator pedal are greater than or equal to respective predetermined thresholds), then the automatic braking triggers are suppressed (step 513). Specifically, in light of the determination of step 512, which indicates that the driver is engaging the accelerator pedal of the host vehicle, automatic braking is not applied based on the current data, regardless of whether other criteria might have otherwise called for automatic braking. The automatic braking triggers are preferably suppressed by the processor 250 of FIG. 2. Following step 513, the process proceeds to the above-referenced step 504, in which the standard or typical active safety thresholds apply (and the adjusted set of active safety thresholds are not implemented), subject to the suppression of step 513.

Conversely, if it is determined in 512 that the position of the accelerator pedal is less than the predetermined threshold of step 512 (and/or that the movement and/or force applied to the accelerator pedal are less than respective predetermined thresholds), then a determination is made as to whether an absolute value of a steering wheel angle gradient is greater than a predetermined threshold (step 514). This determination is preferably made by the processor 250 of FIG. 2 based on calculations made during steps 302-307 of FIG. 3 using measurements obtained by the steering angle sensors 236 of FIG. 2. This threshold is stored in the memory 252 of FIG. 2 as one of the stored values 262 thereof. In one embodiment, this predetermined threshold is equal to approximately 4 radians per second (rad/sec). However, this may vary in other embodiments.

If it is determined in step 514 that the absolute value of a steering wheel angle gradient is greater than the predetermined threshold of step 514, then the automatic braking triggers are suppressed (step 515). Specifically, in light of the determination of step 514, which indicates that the driver is actively engaging the steering wheel of the host vehicle, automatic braking is not applied based on the current data, regardless of whether other criteria might have otherwise called for automatic braking. The automatic braking triggers are preferably suppressed by the processor 250 of FIG. 2. Following step 515, the process proceeds to the above-referenced step 504, in which the standard or typical active safety thresholds apply (and the adjusted set of active safety thresholds are not implemented), subject to the suppression of step 515.

Conversely, if it is determined in step 514 that the absolute value of the steering wheel angle gradient is less than or equal to the predetermined threshold of step 514, then a determination is made as to whether a lateral position of the target object relative to the host vehicle is less than a predetermined threshold (step 516). This determination is preferably made by the processor 250 of FIG. 2 based on calculations made during steps 302-307 of FIG. 3. This threshold is stored in the memory 252 of FIG. 2 as one of the stored values 262 thereof. In one embodiment, this predetermined threshold is equal to approximately ten meters. However, this may vary in other embodiments. If it is determined in step 516 that the lateral position of the target object relative to the host vehicle is greater than or equal to the predetermined threshold of step 516, then the process proceeds to the above-referenced step 504, in which the standard or typical active safety thresholds apply (and the adjusted set of active safety thresholds are not implemented).

Conversely, if it is determined that the lateral position of the target object relative to the host vehicle is less than the predetermined threshold of step 516, then a determination is made as to whether a change in lateral position of the target object is greater than a predetermined threshold (step 518). This determination is preferably made by the processor 250 of FIG. 2 based on calculations made during steps 302-307 of FIG. 3. This threshold is stored in the memory 252 of FIG. 2 as one of the stored values 262 thereof. In one embodiment, this predetermined threshold is equal to approximately 1.6 meters per second (m/s). However, this may vary in other embodiments. If it is determined in step 518 that the change in lateral position of the target object is less than or equal to the predetermined threshold of step 518, then the process proceeds to the above-referenced step 504, in which the standard or typical active safety thresholds apply (and the adjusted set of active safety thresholds are not implemented).

Conversely, if it is determined in step 518 that the change in lateral position of the target object is greater than the predetermined threshold of step 518, then a determination is made as to whether a count is greater than a predetermined value (step 520). This determination is preferably made by the processor 250 of FIG. 2 with respect to a counter as to how many continuous iterations there have been in which the conditions of steps 516 and 518 have been satisfied (namely, that the lateral position of the target object relative to the host vehicle is less than the predetermined threshold of step 516 and the change in lateral position of the target object is greater than the predetermined threshold of step 518 for at least a predetermined amount of time), so as to indicate that the target object is to be classified as an individual who is not in a motor vehicle (for example, a pedestrian or an individual on a bicycle). In one embodiment, this predetermined threshold is equal to approximately 120 milliseconds (ms). However, this may vary in other embodiments. The applicable threshold of step 520 is stored in the memory 252 of FIG. 2 as one of the stored values 262 thereof.

If it is determined in step 520 that the count is less than or equal to the applicable threshold of step 520, the count is incremented by one (step 522). The count is preferably incremented by the processor 250 of FIG. 1. Steps 516-522 thereafter repeat until there is a determination in a subsequent iteration of step 520 that the count is greater than the applicable threshold of step 520.

Once a determination is made in an iteration of step 520 that the count is greater than the applicable threshold of step 520, the target object is classified as being an individual that is not in a motor vehicle (step 523). This classification (which also may be referenced herein as an identification and/or determination) is preferably made by the processor 250 of FIG. 2. This classification preferably comprises a determination that the target object detected in step 304 of FIG. 3 comprises one or more pedestrians and/or one or more human individuals on bicycles or other similar devices.

A determination is then made as to whether a driver of the vehicle is applying the brake pedal of the vehicle (step 524). This determination is preferably made by the processor 250 of FIG. 2 based on information obtained during step 302 of FIG. 3 using measurements from the brake pedal sensors 232 of FIG. 2.

If it is determined that the driver is applying the brake pedal, then the automatic braking triggers are suppressed (step 525). Specifically, in light of the determination of step 524 that the driver is engaging the brake pedal of the host vehicle, automatic braking is not applied based on the current data, regardless of whether other criteria might have otherwise called for automatic braking. The automatic braking triggers are preferably suppressed by the processor 250 of FIG. 2. Following step 525, the process proceeds to the above-referenced step 504, in which the standard or typical active safety thresholds apply (and the adjusted set of active safety thresholds are not implemented), subject to the suppression of step 525.

Conversely, if it is determined in step 524 that the driver is not applying the brake pedal, then a determination is made as to whether any other particular scenario recognition algorithms are active that might conflict with the second sub-process 340 (step 526). Such scenario recognition algorithms may include other specialized braking algorithms such as, by way of example, motorcycle detection algorithms, head-on target algorithms, and the like. This determination is preferably made by the processor 250 of FIG. 2. If it is determined in step 526 that there are one or more such other particular scenario recognition algorithms that are active that might conflict with the second sub-process 340, then the process proceeds to the above-referenced step 504, in which the standard or typical active safety thresholds apply (and the adjusted set of active safety thresholds are not implemented).

Conversely, if it is determined in step 526 that there are no such other particular scenario recognition algorithms that are active that might conflict with the second sub-process 340, then active safety thresholds are adjusted (step 528). As described in greater detail further below, in a preferred embodiment, a time to collision threshold for initiating automatic braking is increased, and a magnitude of automatic braking is decreased, in order to provide an earlier and more gradual automatic braking action and accompanying warning/notification when the target object comprises a pedestrian, a bicycle, or the like rather than a motor vehicle.

The active safety functionality is implemented accordingly using the adjusted active safety thresholds referenced above (step 530). In a preferred embodiment, during step 530, automatic braking is implemented via instructions provided to the braking system 160 of FIG. 1 by the processor 250 of FIG. 1 using adjusted thresholds for triggering the automatic braking and for the magnitude of the automatic braking based on the classification of the target object as an individual that is not in a vehicle.

Specifically, during step 530, automatic braking is applied when a time to collision (as calculated by the processor 250 of FIG. 2) between the target object and the host vehicle is less than a second (or adjusted) predetermined time to collision threshold. This second predetermined time to collision threshold is greater than the typical (or first) time to collision threshold used when the target object is classified as a motor vehicle and not a pedestrian, a bicycle, or the like, such as in step 504.

Also during step 530, automatic braking is applied with a second (or adjusted) magnitude is less than the typical (or first) magnitude of automatic braking that is provided when the target object is classified as a motor vehicle and not a pedestrian, a bicycle, or the like, such as in step 504. In a preferred embodiment, the second magnitude of automatic braking of step 530 has a braking pressure and braking force that are less than the typical braking pressure and braking forces, respectively, of the automatic braking of step 504. Specifically, the second magnitude of automatic braking of step 530 (namely, when the target object is classified as a pedestrian, a bicycle, or the like) is calculated by the processor 250 of FIG. 2 in order to attain a second rate of deceleration for the host vehicle, with the second rate of deceleration being less than a first rate of deceleration attained using the first magnitude of automatic braking of step 504 (namely, when the target object comprises a motor vehicle).

Accordingly, during step 530, the automatic braking begins relatively sooner, and with a relatively smaller deceleration of the host vehicle, when the target object is classified as an individual that is not in a motor vehicle (provided that the other criteria set forth above in connection with the second sub-process 340 are also satisfied), as compared to when the target object is classified as a motor vehicle (for example, with reference to step 504). The resulting earlier application of automatic braking provides additional braking time to help in avoiding a collision between the host vehicle and the pedestrian or bicycle. The automatic application of the brake system in this manner also provides an earlier warning to the driver to take any other measures (such as additional braking by the driver, steering of the host vehicle, and the like) that may further help to prevent a collision. In addition, in certain embodiments, one or more other audio and/or visual warnings may also be provided, such as by the driver notification unit 208 of FIG. 2 based on instructions provided by the processor 250 of FIG. 2.

After a predetermined amount of time, a higher level of automatic braking ensues (step 532). In a preferred embodiment, after the predetermined amount of time, the magnitude of automatic braking in step 532 is equal to that of the above-reference first magnitude of automatic braking of step 504 (for example, in which the target object is classified as a motor vehicle), so as to thereby increase the deceleration rate of the vehicle to be equal to that of step 504 after the predetermined amount of time. Accordingly, when the target object is classified as a pedestrian, a bicycle, or the like, the automatic braking starts relatively earlier and at a relatively lower magnitude as compared with a scenario in which the target object is classified as a motor vehicle, and subsequently increases in magnitude after the predetermined amount of time. In one embodiment, this predetermined amount of time is equal to approximately 0.5 seconds. The increase in magnitude of the automatic braking is provided via the braking system 160 of FIG. 1 based on instructions provided thereto by the processor 250 of FIG. 2.

Accordingly, methods, systems, and vehicles are provided for identifying objects in proximity to a host vehicle, and for controlling active safety functionality for the host vehicle based at least in part on the identifications. The disclosed methods, systems, and vehicles classify the objects in proximity to the vehicle as motor vehicles or individuals not in a motor vehicle based on various factors, including lateral and longitudinal position and movement of the target and the host vehicle. In addition, warnings, automatic braking, and automatic steering are provided and controlled based at least in part on these classifications.

It will be appreciated that the disclosed methods, systems, and vehicles may vary from those depicted in the Figures and described herein. For example, the vehicle 100, ASCS 170, and/or various components thereof may vary from that depicted in FIGS. 1 and 2 and described in connection therewith. Similarly, the vehicle 100, the target objects 604, and/or the placement thereof may differ from that depicted in FIG. 6. In addition, it will be appreciated that certain steps of the process 300 (and/or sub-processes or sub-steps thereof) may vary from those depicted in FIGS. 3-5 and/or described above in connection therewith. It will similarly be appreciated that certain steps of the process described above (and/or sub-processes or sub-steps thereof) may occur simultaneously or in a different order than that depicted in FIGS. 3-5 and/or described above in connection therewith. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for identifying objects in proximity to a host vehicle, the method comprising the steps of:
   detecting a target object in proximity to the host vehicle;
   measuring longitudinal and lateral characteristics of movement of the target object classifying the target object, the classification including a determination as to whether or not the object is a motor vehicle, rather than an individual that is not in a motor vehicle, based at least in part on both:
      a first comparison of one or more longitudinal characteristics of the movement of the target with a first predetermined threshold and a second comparison of one or more lateral characteristics of the movement of the target object with a second predetermined threshold that is different from the first predetermined threshold, using a processor;
   wherein the target object is determined to be a motor vehicle, rather than an individual that is not in a motor vehicle, when:
      an absolute value of a relative lateral velocity of the target object with respect to the host vehicle is less than the first predetermined threshold; and
      an absolute value of a relative longitudinal velocity of the target object with respect to the host vehicle is less than the second predetermined threshold; and providing a notification, a braking or throttle control action, a corrective steering action, and/or a differential braking action if the target object is classified as a motor vehicle.

2. The method of claim 1, further comprising the step of:
determining whether the target object is travelling in a same direction as the host vehicle;
wherein the step of classifying the target object comprises the step of classifying the target object as a motor vehicle, rather than an individual that is not in a motor vehicle, also based on whether the target object is travelling in the same direction as the host vehicle, such that the target object is determined to be a vehicle, rather than an individual that is not in a vehicle, when:
the absolute value of the relative lateral velocity of the target object with respect to the host vehicle is less than the first predetermined threshold;
the absolute value of the relative longitudinal velocity of the target object with respect to the host vehicle is less than the second predetermined threshold; and
the target object is travelling in the same direction as the host vehicle.

3. The method of claim 1, further comprising the step of:
calculating an absolute value of a lateral lane offset between the target object and the host vehicle;
wherein the step of classifying the target object as a motor vehicle comprises the step of classifying the target object as a motor vehicle also based on whether the absolute value of the lateral lane offset is less than a third predetermined threshold, such that the target object is determined to be a vehicle, rather than an individual that is not in a vehicle, when:
the absolute value of the relative lateral velocity of the target object with respect to the host vehicle is less than the first predetermined threshold;
the absolute value of the relative longitudinal velocity of the target object with respect to the host vehicle is less than the second predetermined threshold; and
the absolute value of the lateral lane offset is less than the third predetermined threshold.

4. The method of claim 1, further comprising the step of:
calculating a velocity of the host vehicle;
wherein the step of classifying the target object as a motor vehicle, rather than an individual that is not in a motor vehicle, comprises the step of classifying the target object as a motor vehicle, rather than an individual that is not in a motor vehicle, also based on whether the velocity of the host vehicle is greater than a third predetermined threshold, such that the target object is determined to be a vehicle, rather than an individual that is not in a vehicle, when:
the absolute value of the relative lateral velocity of the target object with respect to the host vehicle is less than the first predetermined threshold;
the absolute value of the relative longitudinal velocity of the target object with respect to the host vehicle is less than the second predetermined threshold; and
the velocity of the host vehicle is greater than the third predetermined threshold.

5. The method of claim 1, further comprising the steps of:
calculating a velocity of the host vehicle; and
calculating a change in lateral position of the target object; and
wherein the step of classifying the target object comprises the step of classifying the target object as an individual not in a motor vehicle if both of the following conditions are satisfied, namely:
the velocity of the host vehicle is less than a third predetermined threshold; and
the change in lateral position of the target object is greater than a fourth predetermined threshold that is different from the third predetermined threshold.

6. The method of claim 5, wherein the host vehicle includes a steering wheel, and the method further comprises the step of:
calculating an absolute value of a steering angle gradient of the steering wheel;
wherein the step of classifying the target object comprises the step of classifying the target object as an individual not in a motor vehicle if each of the following conditions are satisfied, namely:
the velocity of the host vehicle is less than the first third predetermined threshold;
the change in lateral position of the target object is greater than the fourth predetermined threshold; and
the absolute value of the steering angle gradient is less than a third predetermined threshold.

7. The method of claim 5, wherein the host vehicle has an accelerator pedal, and the method further comprises the step of:
measuring a position of the accelerator pedal;
wherein the step of classifying the target object comprises the step of classifying the target object as an individual not in a motor vehicle if each of the following conditions are satisfied, namely:
the velocity of the host vehicle is less than the first third predetermined threshold;
the change in lateral position of the target object is greater than the second fourth predetermined threshold; and
the position of the accelerator pedal is less than a fifth predetermined threshold.

8. A method for controlling an active safety system for a host vehicle, the method comprising the steps of:
identifying a target object in proximity to the host vehicle as being a motor vehicle or an individual that is not in a motor vehicle;
calculating a time to collision between the target object and the host vehicle via a processor;
implementing the active safety system in the host vehicle based on whether the time to collision is less than a first predetermined threshold if the target object is identified as comprising a motor vehicle; and
implementing the same active safety system in the same host vehicle based on whether the time to collision is less than a second predetermined threshold if the target object is identified as comprising an individual not in a motor vehicle, the second predetermined threshold being greater than the first predetermined threshold, such that the same active safety system is triggered earlier if the target object is identified as an individual not in a motor vehicle as compared with if the target object is identified as a motor vehicle.

9. The method of claim 8, wherein the steps of implementing the active safety system further comprise the steps of:
applying automatic braking at a first rate if the target object is identified as a motor vehicle; and
applying automatic braking at a second rate if the target object is identified as comprising an individual not in a motor vehicle.

10. The method of claim 8, further comprising the step of:
identifying the target object as comprising an individual not in a motor vehicle if the target object is determined to be a pedestrian or a bicycle.

11. The method of claim 8, further comprising the steps of:
calculating a velocity of the host vehicle;
calculating a change in lateral position of the target object; and
identifying the target object as comprising an individual not in a motor vehicle if both of the following conditions are satisfied, namely:
the velocity of the host vehicle is less than a third predetermined threshold; and
the change in lateral position of the target object is greater than a fourth predetermined threshold.

12. The method of claim 11, wherein the host vehicle has a steering wheel, and the method further comprises the step of:
calculating an absolute value of a steering angle gradient of the steering wheel;
wherein the steps of identifying the target object as comprising an individual not in a motor vehicle comprises the step of identifying the target object as comprising an individual not in a motor vehicle if each of the following conditions are satisfied, namely:
the velocity of the host vehicle is less than the third predetermined threshold;
the change in lateral position of the target object is greater than the fourth predetermined threshold; and
the absolute value of the steering angle gradient is less than a fifth predetermined threshold.

13. The method of claim 11, wherein the host vehicle has an accelerator pedal, and the method further comprises the step of:
measuring a position of the accelerator pedal;
wherein the steps of identifying the target object as comprising an individual not in a motor vehicle comprises the step of identifying the target object as comprising an individual not in a motor vehicle if each of the following conditions are satisfied, namely:
the velocity of the host vehicle is less than the third predetermined threshold;
the change in lateral position of the target object is greater than the fourth predetermined threshold; and
the position of the accelerator pedal is less than a fifth predetermined threshold.

14. A vehicle comprising:
a drive system; and
an active safety system coupled to the drive system and configured to provide an action during a drive cycle of the vehicle, the active safety system comprising:
a detection unit configured to:
detect a target object in proximity to the vehicle, the active safety system; and
measure values pertaining to a longitudinal characteristic and a lateral characteristic of movement of the target object; and
a processor coupled to the detection unit and configured to classify the target object, the classification including a determination as to whether or not the object is a motor vehicle, rather than an individual that is not in a motor vehicle, based at least in part on both:
a first comparison of the longitudinal characteristic of the movement of the target with a first predetermined threshold;
and a second comparison of the lateral characteristic of the movement of the target object with a second predetermined threshold that is different from the first predetermined threshold, for use in providing the action, wherein the processor is configured to determine that the target object is a motor vehicle, rather than an individual that is not in a motor vehicle, when:
an absolute value of a relative lateral velocity of the target object with respect to the host vehicle is less than the first predetermined threshold; and
an absolute value of a relative longitudinal velocity of the target object with respect to the host vehicle is less than the second predetermined threshold.

15. The vehicle of claim 14, wherein the processor is further configured to classify the target object as a motor vehicle, rather than an individual that is not in a motor vehicle, based at least in part on whether each of the following conditions are satisfied, namely:
the target object is travelling in a same direction as the vehicle;
an absolute value of a lateral lane offset between the target object and the vehicle is less than a third predetermined threshold; and
a velocity of the vehicle is greater than a fourth predetermined threshold.

16. The vehicle of claim 14, wherein the vehicle includes a steering wheel and an accelerator pedal, and the processor is further configured to classify the target object as an individual not in a motor vehicle if each of the following conditions are satisfied, namely:
a velocity of the vehicle is less than a first predetermined threshold;
a change in lateral position of the target object is greater than the second predetermined threshold;
an absolute value of a steering angle gradient of the steering wheel is less than a third predetermined threshold; and
a position of the accelerator pedal is less than a fourth predetermined threshold.

17. The vehicle of claim 14, wherein the vehicle includes a braking system, and the processor is further configured to:
calculate a time to collision between the target object and the vehicle;
classify the target object;
implement automatic braking via the braking system if the time to collision is less than a third predetermined threshold if the target object is classified as comprising a motor vehicle; and
implement the automatic braking via the same braking system if the time to collision is less than a fourth predetermined threshold if the target object is classified as comprising an individual not in a motor vehicle, the fourth predetermined threshold being greater than the third predetermined threshold, such that the automatic braking of the same braking system is triggered earlier if the target object is identified as an individual not in a motor vehicle as compared with if the target object is identified as a motor vehicle.

18. The method of claim 1, wherein the target object is determined to be an individual that is not in a motor vehicle, when either or both of the following conditions occur:
the absolute value of the relative lateral velocity of the target object with respect to the host vehicle is greater than the first predetermined threshold; or the absolute value of the relative longitudinal velocity of the target object with respect to the host vehicle is less than the second predetermined threshold.

19. The method of claim 1, wherein the target object is determined to be a motor vehicle, rather than an individual that is not in a motor vehicle, if, and only if, each of the following conditions occur:
- the absolute value of the relative lateral velocity of the target object with respect to the host vehicle is less than the first predetermined threshold;
- the absolute value of the relative longitudinal velocity of the target object with respect to the host vehicle is less than the second predetermined threshold;
- the target object is travelling in the same direction as the host vehicle;
- an absolute value of a lateral lane offset of the target object with respect to the host vehicle is less than a third predetermined threshold; and
- a velocity of the host vehicle is greater than a fourth predetermined threshold.

* * * * *